May 19, 1964 L. C. RUBENS 3,133,825
FLUID VINYL CHLORIDE POLYMER COMPOSITIONS, AND RIGID CROSS-LINKED
VINYL CHLORIDE POLYMERIC PRODUCTS HAVING REINFORCING
FABROUS MATERIAL EMBEDDED THEREIN, AND
METHOD OF MAKING THE SAME
Filed June 20, 1960

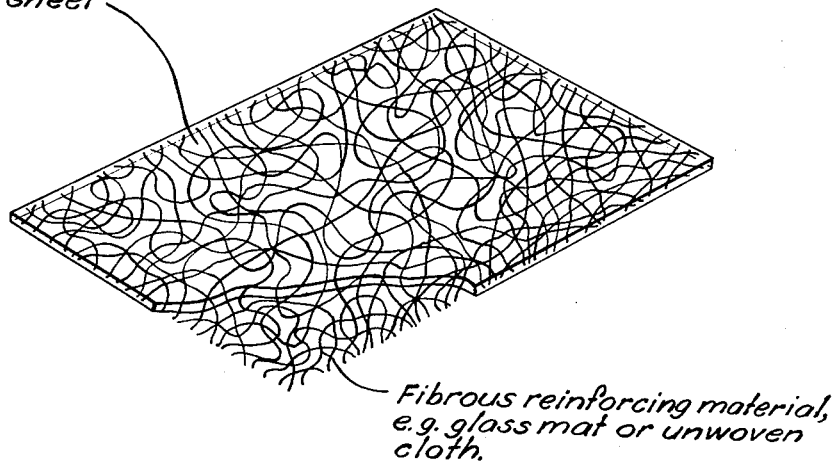

Reinforced vinyl chloride polymer-polyester resin sheet

Fibrous reinforcing material, e.g. glass mat or unwoven cloth.

INVENTOR.
Louis C. Rubens
BY

*Griswold & Burdick*
ATTORNEYS

United States Patent Office 3,133,825
Patented May 19, 1964

3,133,825
FLUID VINYL CHLORIDE POLYMER COMPOSITIONS, AND RIGID CROSS-LINKED VINYL CHLORIDE POLYMERIC PRODUCTS HAVING REINFORCING FIBROUS MATERIAL EMBEDDED THEREIN, AND METHOD OF MAKING THE SAME
Louis C. Rubens, Midland, Mich., assignor to The Dow Chemical Company, Midland, Mich., a corporation of Delaware
Filed June 20, 1960, Ser. No. 37,045
4 Claims. (Cl. 117—62)

This invention concerns fluid vinyl chloride polymer compositions capable of being converted to cross-linked polymeric products and pertains especially to rigid cross-linked vinyl chloride polymeric products having reinforcing fibrous material embedded therein and a method for making the compositions and the cross-linked polymeric products.

Vinyl chloride polymers and compositions thereof comprising the vinyl chloride polymers and plasticizers are useful for a variety of purposes in the home and industry. One method for making molded or shaped articles from vinyl chloride polymers consists in blending or dispersing the finely divided polymer in a liquid plasticizer to form a flowable mixture which can be poured into a mold, then is heated to fuse or solvate the polymer with the plasticizer, after which the heated material is cooled to produce a shaped article conforming to the configuration of the mold. Such dispersions of vinyl chloride polymers in a liquid plasticizer are known to the art as plastisols and they are commonly employed in preparing molded or shaped articles of vinyl chloride polymers. Articles prepared from plasticized vinyl chloride polymers, particularly plastisols, are usually relatively soft flexible products which restricts greatly the utility for which the vinyl chloride polymers are otherwise well suited.

It is accordingly a primary object of the invention to provide a method for making fluid vinyl chloride polymer compositions which are capable of being converted to rigid cross-linked vinyl chloride polymeric products. Another object is to provide a method for converting fluid vinyl chloride polymer compositions of the plastisol type into rigid cross-linked vinyl chloride polymer products. Still another object is to provide a method for making rigid cross-linked vinyl chloride polymer products. Still another object is to provide a method for making rigid cross-linked vinyl chloride polymer products having reinforcing fibrous material embedded therein. A further object is to provide cross-linked vinyl chloride polymer products containing reinforcing fibrous material embedded therein. Other and related objects will appear from the following description of the invention.

According to the invention the foregoing and related objects are obtained by blending or dispersing a finely divided vinyl chloride polymer in the form of discrete particles of the plastisol type in a liquid mixture of polymerizable monomers consisting essentially of a monovinyl aromatic compound of the benzene series and a polyethylenically unsaturated aliphatic organic compound copolymerizable with the monovinyl aromatic compound, in proportions as hereinafter stated to form a fluid mixture or plastisol at ordinary temperatures. The fluid mixture of the vinyl chloride polymer dispersed in the liquid monomers is readily converted into a rigid cross-linked polymeric product by subjecting the mixture to the action of high energy ionizing radiation. In the preparation of cross-linked polymeric products having reinforcing fibrous material embedded therein, the fluid mixture or composition of the vinyl chloride polymer dispersed in the liquid monomers is coated or buttered onto a matte or woven sheet of the fibrous material or the fibrous material is immersed in the fluid composition after which it is pressed into a predetermined shape and thickness. Thereafter, the shaped material can be cured by interpolymerization of the monomers in intimate contact with the vinyl chloride polymer. Such interpolymerization is carried out by subjecting the pressed and shaped material to the action of high energy ionizing radiation at an intensity and for a total dose as hereinafter defined. The pressed and shaped material can be irradiated with the high energy ionizing radiation while having the finely divided vinyl chloride polymer dispersed as discrete particles in the liquid mixture of monomers, or alternatively, the pressed and shaped material can be heated at elevated temperature, e.g. at from about 70° to 150° C., to solvate the polymer with the monomers, after which the fused or solvated polymeric material is irradiated. It may be mentioned that somewhat smaller amounts of total dosages of radiation are effective to initiate and polymerize the monomers when the pressed and shaped material contains the vinyl chloride polymer in the form of discrete particles, than is required to interpolymerize the monomers with the polymer when the pressed and shaped material is first heated at elevated temperatures to solvate and fuse the polymer and monomers into a homogeneous gel-like phase, then is irradiated to polymerize the monomers.

The vinyl chloride polymers to be employed in the invention can be polyvinyl chloride or a copolymer that contains at least 80 percent by weight of vinyl chloride chemically combined or interpolymerized with not more than 20 percent by weight of another monoethylenically unsaturated monomer or monomers such as vinyl acetate, vinyl propionate, methyl acrylate, butyl acrylate, methyl methacrylate, butyl methacrylate, acrylonitrile, vinylidene chloride and the like. The vinyl chloride polymers are of the plastisol grade, i.e. they are of solid dense particles of average diameters in the range of from 0.5 to 2.0 microns, and are readily converted into plastisols by thorough stirring with a plasticizer, e.g. dioctyl phthalate.

The monovinyl aromatic compounds to be employed in the invention are the liquid monomers of the benzene series having the general formula:

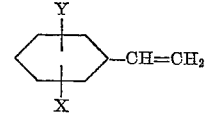

wherein X and Y each represent a member of the group consisting of hydrogen, halogen and lower alkyl radicals containing from 1 to 4 carbon atoms. Examples of such monomers are styrene, vinyltoluene, vinylxylene, ethylvinylbenzene, isopropylstyrene, chlorostyrene, dichlorostyrene, bromostyrene, fluorostyrene, ar-ethyl ar-chlorostyrene, ar-methyl ar-chlorostyrene and diethylstyrene.

The polyethylenically unsaturated organic monomers to be employed in the invention can be an organic compound of the group consisting of: (a) esters of monobasic unsaturated aliphatic acids such as acrylic acid and methacrylic acid and a hydroxy compound of the group consisting of vinyl alcohol, allyl alcohol, methallyl alcohol, glycerol, 1,3-propanediol and glycols and polyglycols having the general formula HO—$(C_nH_{2n}O)_m$—H, wherein $n$ is a whole number from 2 to 3 and $m$ is an integer from 1 to 14 with the proviso that said polyglycols have an average molecular weight not substantially greater than 600 such as the di-, tri-, tetra-, penta-, and up to tetradecyl ethylene glycols and the di-, tri-, tetra-, penta-, and up to decyl propylene glycols; and (b) esters of polybasic aliphatic acids such as maleic acid, fumaric acid, itaconic acid and citraconic acid and glycols and polyglycols having the general formula given above; and (c) unsaturated polyesters of maleic acid or fumaric acid and glycols having the general formula

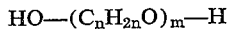

wherein $n$ is a whole number from 2 to 3 and $m$ is an integer from 1 to 2, which unsaturated polyesters have a molecular weight between 258 and 2000.

The fluid compositions of the invention are prepared by mixing or intimately dispersing from 35 to 65 percent by weight of a finely divided solid vinyl chloride polymer of the plastisol type in the form of discrete particles with from 65 to 35 percent by weight of a liquid mixture of polymerizable monomers consisting essentially of from 40 to 97.5 percent by weight of at least one monovinyl aromatic compound of the benzene series having the general formula:

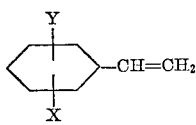

wherein X and Y each represents a member of the group consisting of hydrogen, halogen and lower alkyl radicals containing from 1 to 4 carbon atoms, and from 60 to 2.5 percent by weight of a polyethylenically unsaturated organic compound copolymerizable with the monovinyl aromatic compound and selected from the group consisting of the esters of acrylic acid and methacrylic acid and an alcohol or polyol of the groups (a) and (b) herein defined, with the resultant production of a flowable composition, preferably having an absolute viscosity between 250 and 2000 centipoises at 25° C.

Such flowable compositions can readily be poured or forced into a mold cavity, spread as a layer on a flat plate or belt or on a mat or sheet of fibrous material such as cloth, wood fibers, cotton linters, glass fibers, glass cloth, paper and the like, then pressed and cured to form molded rigid articles or laminates suitable for a variety of purposes.

In a specific embodiment the fluid compositions are employed to impregnate or coat fibrous materials such as a matte or woven cloth of glass fibers to produce rigid vinyl chloride polymeric products having the reinforcing fibrous material embedded therein.

The fluid compositions comprising the finely divided particles of vinyl chloride polymer dispersed in the mixture of polymerizable monomers are converted to gels upon solvating of the particles of vinyl chloride polymer by the monomers, frequently upon standing at room temperature, or thereabout, but preferably by heating at a temperature of about 135° C. or above with or without the application of pressure.

The fluid, and the gelled, compositions are cured or converted to rigid polymeric products by polymerization of the monomers under the action of high energy ionizing radiations such as high speed electrons, gamma ray, X-rays, and the like. Convenient sources of such radiations are Van de Graaff generators, cobalt-60 and X-ray machines.

The high energy radiation to be employed is preferably of an intensity corresponding to at least 40,000 rads per hour and is used in amount corresponding to a total dose of from about 0.4 to 10 megarads.

The "rad" adopted by the Seventh International Congress of Radiology, Copenhagen, 1953, is a unit of absorbed dose which corresponds to the absorption of 100 ergs per gram of the irradiated material at the dosage site.

The total dose of high energy ionizing radiation required to cure or polymerize the monomers to produce a rigid polymeric product will vary somewhat depending in part upon the proportions of the monomers employed and in part upon the sensitivity of the monomers to be polymerized by high energy ionizing radiations. Greater dosages than about 10 megarads of the radiation can be used, but in general, higher dosages of irradiation tend to cause deterioration and discoloring of the polymeric product, and are to be avoided.

The following examples illustrate ways in which the principle of the invention has been applied, but are not to be construed as limiting its scope.

*Example 1*

A fluid vinyl chloride polymer composition capable of being converted to a cross-linked polymeric product was prepared by blending a charge of 60 grams of polyvinyl chloride polymer of plastisol grade, with 32 grams of a mixture of 65 percent by weight of meta-vinyltoluene and 35 percent by weight of para-vinyltoluene, and 8 grams of ethylene glycol dimethacrylate at room temperature for a period of about 5 minutes. The composition was readily pourable.

The composition was spread uniformly onto a sheet of a chopped strand fiberglass mat 20 centimeters square are weighing 10.3 grams. The coated fiberglass mat was pressed between sheets of aluminum foil to a thickness of 2.5 millimeters and was heated to a temperature of 135° C. to solvate the vinyl chloride polymer with the monomers, than was cooled and the aluminum foil removed. The laminate was a clear tough flexible sheet. The laminate was subjected to high energy ionizing radiation by exposing it under a beam of high speed electrons from a Van de Graaff generator operating at 75 microamperes beam current and 2 mev. potential for a total dose of 1.9 megarads. The monomers were completely polymerized to produce a rigid transparent vinyl chloride polymeric laminate having the glass fibers embedded therein and having the properties:

Flexural modulus _____ 570,000 lbs/sq. in.
Impact strength _____ 6.3 ft.-lbs.
Heat distortion temp. _____ 134° C.

*Example 2*

A vinyl chloride polymer composition similar to that described in Example 1 was prepared and heated, in the form of a layer about 3 millimeters thick, to a temperature of 135° C. to form a transparent flexible sheet. The sheet was irradiated with high speed electrons for a dose of 1.9 megarads as described in Example 1. The irradiated sheet was a transparent rigid article having the properties:

Flexural modulus _____ 350,000 lbs./sq. in.
Impact strength _____ 4.4 ft.-lbs.
Heat distortion temp. _____ 86° C.

*Example 3*

A fluid vinyl chloride polymer composition similar to that described in Example 1 was prepared and was coated onto a sheet of a chopped strand fiberglass mat weighing 1.5 ounces per square foot, then was pressed to a thickness of 2.5 millimeters at room temperature. After about five minutes the sheet was sufficiently firm to be handled without fracture. The sheet was subjected to high speed electrons from a Van de Graaff generator operating at a beam current of 75 microamperes and 2 mev. potential for a dose of 1.5 megarads. The monomers were completely polymerized to form a rigid translucent laminate comprising the polymeric ingredients having the glass fibers embedded therein. The drawing illustrates the fiber reinforced sheet.

*Example 4*

A fluid vinyl chloride polymer composition was prepared by blending 60 grams of polyvinyl chloride polymer of plastisol grade with 32 grams of styrene and 8 grams of ethylene glycol dimethacrylate. The dispersion is quite fluid and pourable immediately after mixing, but rapidly becomes too viscous to pour in a period of from 3 to 5 minutes after mixing. A fluid composition as prepared above was uniformly spread over a chopped strand fiberglass mat and pressed to a flat sheet. After standing at room temperature for several minutes the sheet was quite firm. It was irradiated with high energy radiation for a total dose of 2.5 megarads and was converted into a hard rigid laminate.

For purpose of comparison, a vinyl chloride polymer composition was prepared by blending 60 parts by weight of the powdered polyvinyl chloride polymer with 40 parts by weight of styrene. The composition was a grease-like paste, and when a layer of the composition was exposed to high energy ionizing radiation it required a total dose of 9 megarads to completely polymerize the monomeric styrene.

*Example 5*

A fluid vinyl chloride polymer composition was prepared by blending 60 grams of powdered polyvinyl chloride of plastisol grade with 32 grams of a vinyltoluene fraction, consisting of 65 percent by weight of meta-vinyltoluene and 35 percent of para-vinyltoluene, and 8 grams of a polyester consisting of a reaction product of a mixture of 1.08 grams molecular proportion of 1,2-propylene glycol and 1.0 gram molecular proportion of maleic anhydride, which polyester had a molecular weight of approximately 2000. The composition had an absolute viscosity of centipoises as initially prepared.

The composition was spread as a uniform layer on a chopped strand fiberglass mat in proportions corresponding to 90 parts by weight of the composition and 10 parts by weight of the glass fibers. The resulting sheet was pressed to a thickness of about 3 millimeters and was heated at a temperature of 135° C. for a period of 2 minutes, then was cooled to room temperature. The coated sheet was transparent, tough and flexible. The sheet was subjected to high speed electrons from a Van de Graaff generator operating at a beam current of 75 microamperes and 2 mev. potential. A dose of 1.96 megarads completely polymerized the monomers and polyester to produce a rigid transparent cross-linked laminate having the glass fibers embedded therein.

*Example 6*

A fluid vinyl chloride polymer composition was prepared by blending 60 parts by weight of finely divided polyvinyl chloride of plastisol grade with 32 parts by weight of a vinyltoluene fraction, consisting of 65 percent by weight of meta-vinyltoluene and 35 percent of para-vinyltoluene, and 8 parts by weight of ethylene glycol dimethacrylate. The composition was employed to prepare a laminate as follows:

A plate of Dowmetal, a magnesium alloy containing 3 percent by weight of aluminum, 0.1 percent manganese and 1 percent zinc, having the dimensions 14 x 14 inches by 0.01 inch thick was placed on a table and covered with a polyethylene terephthalate film 0.5 mil thick. A sheet of a chopped strand fiberglass mat was laid over the polyethylene terephthalate film. A portion of the fluid vinyl chloride polymer composition was spread uniformly over the fiberglass mat to form a layer of the composition about 50 mils thick. A panel of rigid polyvinyl chloride foam having the dimensions 12 x 12 inches by 1 inch thick and a density of 2 pounds per cubic foot of the foam was placed over the coated fiberglass sheet. Another sheet of the fiberglass mat was placed on top of the foam polyvinyl chloride panel. Another portion of the fluid vinyl chloride polymer composition was spread evenly over the top sheet of the fiberglass mat to form a layer about 50 mils thick. A sheet of 0.5 mil thick polyethylene terephthalate film was placed over the coated fiberglass mat, and another Dowmetal sheet placed on top of it. The assembly was held together by clamps and was subjected to high energy ionizing radiation by passing the assembly under a beam from a Van de Graaff generator operating at a beam current of 75 microamperes and 2 mev. potential so that each side of the assembly containing the vinyl chloride polymer composition was subjected to a total dose of 2 megarads. After treatment with the high energy radiation the assembly was removed and the Dowmetal plates were removed. The polyethylene terephthalate films were stripped from the laminate. The product was a sandwich structure comprising a center core of the polyvinyl chloride foam with a glass fiber reinforced rigid vinyl chloride polymer composition plastic skin tenaciously bonded to each side of the foam core.

*Example 7*

A flowable polyvinyl chloride composition was prepared by blending 60 parts by weight of polyvinyl chloride resin plastisol type, with a liquid solution of 2.4 parts by weight of ethylene glycol dimethacrylate, 10.9 parts by weight of an unsaturated polyester resin consisting of the reaction product of maleic acid and propylene glycol, which polyester had a molecular weight between 500 and 600, and 26.7 parts by weight of a mixture of approximately 67 percent by weight of m-vinyltoluene and 33 percent of p-vinyltoluene. The composition was layered onto a mat of unwoven glass fibers 4 x 4 inches by 0.125 inch thick laid on a film of polyethylene terephthalate and was pressed in a mold while heating the same at a temperature of 135° C. as determined by a thermocouple embedded in the center of the sheet for a period of 3 minutes to fuse the polyvinyl chloride resin and the monomers. The resulting product was a flexible sheet 0.125 inch thick having the glass fibers embedded therein. The sheet was placed on a stainless steel conveyer belt and was passed through the beam of a Van de Graaff accelerator operating at 75 microamperes beam current and 2 mev. potential. The sheet was passed through the electron beam at a conveyer speed of 12 centimeters per second and for 47 consecutive passes while observing the time to reach a maximum temperature as measured by the thermocouple embedded in the sheet. A maximum temperature of 134° C. was observed 5 minutes after the start of the irradiation and corresponded to a total dose 1.78 megarads. The polymerization of the monomers was substantially complete. The resulting product was a rigid reinforced polyvinyl chloride resin laminate.

In a second experiment a portion of the composition was layered onto a mat of glass fibers 4 x 4 inches by 0.125 inch thick and was pressed without heating to form a sheet 0.125 inch thick. This sheet was passed through the electron beam at a rate of about 5 centimeters per second for 11 consecutive passes for a dose of 0.14 megarad per pass or a total dose of 1.54 megarads. A maximum temperature of 101° C. was observed 3.7 minutes after the start of the irradiation. The resulting product was a rigid reinforced polyvinyl chloride resin laminate.

*Example 8*

A flowable polyvinyl chloride composition was prepared by blending 60 parts by weight of polyvinyl chloride resin of plastisol grade with a liquid mixture of 32 grams of vinyltoluene consisting of approximately 65 percent by weight m-vinyltoluene and 35 percent p-vinyltoluene, and 8 grams of tetrapropylene glycol dimaleate, at room temperature for a period of 5 minutes. A portion of the composition was poured into an aluminum pan mold to form a layer 4 x 4 inches by ⅛ inch deep. The layer was exposed to a beam of high speed electrons from a Van de Graaff accelerator operating at a beam current of 75 milliamperes and 2 mev. potential for a total dose of 2 megarads. The cured sheet was a rigid transparent product.

I claim:

1. A fluid laminating vinyl chloride polymer composition capable of being converted to a cross-linked polymeric product having good adhesion to metals, wood, cellulosic fibers and glass which comprises a homogeneous dispersion of from 35 to 65 percent by weight of a finely divided solid vinyl chloride polymer of the plastisol type in the form of discrete particles suspended in a liquid mixture of from 65 to 35 percent by weight of polymerizable monomers consisting essentially of from 40 to 97.5 percent by weight of a monovinyl aromatic compound having the general formula:

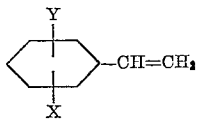

wherein X and Y each represents a member of the group consisting of hydrogen, halogen and lower alkyl radicals containing from 1 to 4 carbon atoms, and from 60 to 2.5 percent by weight of a polyethylenically unsaturated organic compound copolymerizable with the monovinyl aromatic compound and selected from the group consisting of: (a) an ester of an unsaturated acid selected from the group consisting of acrylic acid and methacrylic acid with a hydroxy compound selected from the group consisting of vinyl alcohol, allyl alcohol, methallyl alcohol, glycerol, 1,3-propanediol and glycols and polyglycols having the general formula $HO-(C_nH_{2n}O)_m-H$, wherein $n$ is a whole number from 2 to 3 and $m$ is an integer from 1 to 14 with the proviso that said polyglycols have an average molecular weight of not more than about 600; and (b) esters of a polybasic acid selected from the group consisting of maleic acid, fumaric acid, itaconic acid and citraconic acid, with a hydroxy compound selected from the group consisting of glycols, and polyglycols having the general formula given above; which esters have an average molecular weight between 258 and 2000.

2. A fluid laminating vinyl chloride polymer composition capable of being converted to a cross-linked polymeric product having good adhesion to metals, wood, cellulosic fibers and glass which comprises a homogeneous dispersion of from 35 to 65 percent by weight of a finely divided solid vinyl chloride polymer of the plastisol type in the form of discrete particles suspended in a liquid mixture of from 65 to 35 percent by weight of polymerizable monomers consisting essentially of from 40 to 97.5 percent by weight of a monovinyl aromatic compound having the general formula:

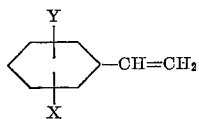

wherein X and Y each represents a member of the group consisting of hydrogen, halogen and lower alkyl radicals containing from 1 to 4 carbon atoms, and from 60 to 2.5 percent by weight of a polyethylenically unsaturated organic compound copolymerizable with the monovinyl aromatic compound and selected from the group consisting of: (a) an ester of an unsaturated acid selected from the group consisting of acrylic acid and methacrylic acid with a hydroxy compound selected from the group consisting of vinyl alcohol, allyl alcohol, methallyl alcohol, glycerol, 1,3-propanediol and glycols and polyglycols having the general formula $HO-(C_nH_{2n}O)_m-H$, wherein $n$ is a whole number from 2 to 3 and $m$ is an integer from 1 to 14 with the proviso that said polyglycols have an average molecular weight of not more than about 600; and (b) esters of a polybasic acid selected from the group consisting of maleic acid, fumaric acid, itaconic acid and citraconic acid; with a hydroxy compound selected from the group consisting of glycols and polyglycols having the general formula given above which esters have an average molecular weight between 258 and 2000, said composition having an absolute viscosity between 250 and 1000 centipoises at 25° C.

3. A method for making a cross-linked vinyl chloride polymer product having reinforcing fibrous material embedded therein, which method comprises coating a fibrous material with a fluid vinyl chloride polymer composition consisting essentially of from 35 to 65 percent by weight of a finely divided solid vinyl chloride polymer of the plastisol type in the form of discrete particles suspended in from 35 to 65 percent by weight of a liquid mixture of polymerizable monomers consisting essentially of from 40 to 97.5 percent by weight of a monovinyl aromatic compound having the general formula:

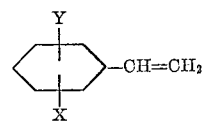

wherein X and Y each represent a member of the group consisting of hydrogen, halogen and lower alkyl radicals containing from 1 to 4 carbon atoms, and from 60 to 2.5 percent by weight of a polyethylenically unsaturated organic compound copolymerizable with the monovinyl aromatic compound and selected from the group consisting of: (a) an ester of an unsaturated acid selected from the group consisting of acrylic acid and methacrylic acid with a hydroxy compound selected from the group consisting of vinyl alcohol, allyl alcohol, methallyl alcohol, glycerol, 1,3-propanediol and glycols and polyglycols having the general formula $HO-(C_nH_{2n}O)_m-H$, wherein $n$ is a whole number from 2 to 3 and $m$ is an integer from 1 to 14 with the proviso that said polyglycols have an average molecular weight of not more than about 600; and (b) esters of a polybasic acid selected from the group consisting of maleic acid, fumaric acid, itaconic acid and citraconic acid with a hydroxy compound selected from the group consisting of glycols and polyglycols having the general formula given above, which esters have an average molecular weight between 258 and 2000, to form a fluid vinyl chloride polymer composition which has an absolute viscosity between 250 and 1000 centipoises at 25° C., pressing the coated fibrous material into a predetermined thickness and shape and polymerizing the monomers by subjecting the fluid vinyl chloride polymer composition to high energy ionizing radiation in a field having an intensity of at least 0.04 megarad per hour for a total dose of from 0.5 to 10 megarads, whereby the fluid vinyl chloride polymer composition is converted to a rigid cross-linked fiber reinforced plastic body.

4. A rigid cross-linked vinyl chloride polymer article which comprises a polymeric vinyl chloride composition consisting essentially of from 35 to 65 percent by weight of a finely divided solid vinyl chloride polymer of the plastisol type interpolymerized with from 65 to 35 percent by weight of a mixture of polymerized monomers consisting essentially of from 40 to 97.5 percent by weight of a monovinyl aromatic compound of the benzene series having the general formula:

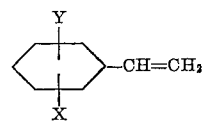

wherein X and Y each represent a member of the group consisting of hydrogen, halogen and lower alkyl radicals containing from 1 to 4 carbon atoms, and from 60 to 2.5 percent by weight of a polyethylenically unsaturated organic compound copolymerizable with the monovinyl aromatic compound and selected from the group consisting of: (a) an ester of an unsaturated acid selected from the group consisting of acrylic acid and methacrylic acid with a hydroxy compound selected from the group consisting of vinyl alcohol, allyl alcohol, methallyl alcohol, glycerol 1,3-propanediol and glycols and polyglycols having the general formula $HO-(C_nH_{2n}O)_m-H$, wherein $n$ is a whole number from 2 to 3 and $m$ is an integer from 1 to 14 with the proviso that said polyglycols have an average molecular weight of not more than about 600; and (b) esters of a polybasic acid selected from the group consisting of maleic acid, fumaric acid, itaconic acid and citraconic acid, a hydroxy compound selected from the group consisting of glycols and polyglycols having the general formula given above, which esters have an average molecular weight between 258 and 2000, said crosslinked vinyl chloride polymer composition having a minor proportion of a reinforcing fibrous material embedded therein.

References Cited in the file of this patent

UNITED STATES PATENTS

| | | |
|---|---|---|
| 2,567,719 | Loritsch et al. | Sept. 11, 1951 |
| 2,922,768 | Mino et al. | Jan. 26, 1960 |
| 2,951,772 | Marzocchi et al. | Sept. 6, 1960 |

FOREIGN PATENTS

| | | |
|---|---|---|
| 213,169 | Australia | Feb. 18, 1958 |